(12) United States Patent
Wagenhuber et al.

(10) Patent No.: US 8,249,772 B2
(45) Date of Patent: Aug. 21, 2012

(54) ELECTRIC WIRING SYSTEM OF A MOTOR VEHICLE WITH AN AUTHENTICATION APPARATUS

(75) Inventors: Josef Wagenhuber, Gerolsbach (DE); Burkhard Kuhls, Stadtbergen (DE); Marc Lindlbauer, Munich (DE); Harry Knechtel, Berglern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 751 days.

(21) Appl. No.: 12/355,354

(22) Filed: Jan. 16, 2009

(65) Prior Publication Data
US 2009/0182461 A1    Jul. 16, 2009

(30) Foreign Application Priority Data
Jan. 21, 2008  (DE) .......... 10 2008 005 309

(51) Int. Cl.
*B60R 25/00* (2006.01)
*B60R 16/02* (2006.01)
(52) U.S. Cl. ..... 701/32.6; 701/29.6; 180/287; 307/10.3; 307/10.5; 340/426.11
(58) Field of Classification Search ............ 701/32; 180/287; 340/426.11; 307/10.2, 10.3, 10.4, 307/10.5
See application file for complete search history.

(56) References Cited

U.S. PATENT DOCUMENTS

| | | | | |
|---|---|---|---|---|
| 5,835,868 A * | 11/1998 | McElroy et al. | ................... | 701/2 |
| 6,127,947 A * | 10/2000 | Uchida et al. | .................. | 340/999 |
| 6,204,570 B1 * | 3/2001 | Muller | .......................... | 307/10.5 |
| 6,788,189 B2 * | 9/2004 | Kikkawa et al. | ............ | 340/426.1 |
| 6,888,265 B2 * | 5/2005 | Turner et al. | .................. | 307/10.2 |
| 7,462,953 B2 * | 12/2008 | Kamiya et al. | ............... | 307/10.3 |
| 2002/0145535 A1 * | 10/2002 | Flick | ........................ | 340/825.69 |

* cited by examiner

Primary Examiner — Paul N Dickson
Assistant Examiner — George Spisich
(74) Attorney, Agent, or Firm — Crowell & Moring LLP

(57) ABSTRACT

An electric wiring system of a motor vehicle with several control devices that communicate with each other via a data bus, and with an immobilizer is provided. In order to create an electric wiring system of a motor vehicle that includes an immobilizer with high reliability the immobilizer includes at least a first and a second control device from the plurality of control devices and an authentication apparatus, in particular an authentication control device. The authentication information of the plurality of control devices is supplied via the data bus to the authentication apparatus. The authentication cancels the immobilizer of the vehicle when the authentication information transmitted from the first and the second control device corresponds to the authentication information expected for the particular control devices.

20 Claims, 1 Drawing Sheet

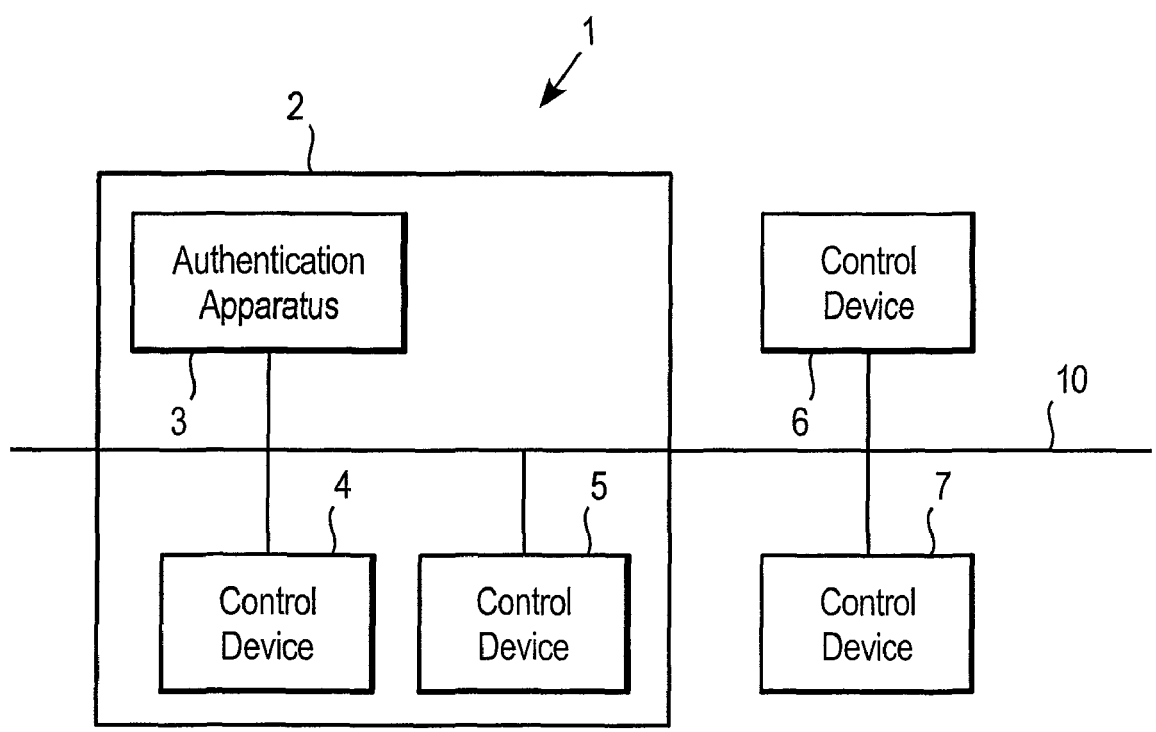

ELECTRIC WIRING SYSTEM OF A MOTOR VEHICLE WITH AN AUTHENTICATION APPARATUS

CROSS REFERENCE TO RELATED APPLICATIONS

This application claims priority under 35 U.S.C. § 119 to German Patent Application No. 102008005309.0, filed Jan. 21, 2008, the entire disclosure of which are herein expressly incorporated by reference.

BACKGROUND AND SUMMARY OF THE INVENTION

The invention relates to an electric wiring system of a motor vehicle with several control devices that communicate with each other via a data bus, and with an immobilizer.

A known electric wiring system comprises an immobilizer that is disconnected when the vehicle key emits the expected message.

The invention has the problem of creating an electric wiring system of a motor vehicle that comprises an immobilizer with great reliability.

This problem is solved by an electric wiring system with the features of the present invention.

The invention forms the known electric wiring system of a motor vehicle with several control devices that communicate with each other via a data bus, and that is provided with an immobilizer. Furthermore, the immobilizer in accordance with the invention comprises at least a first and a second control device from the plurality of control devices and includes an authentication apparatus, in particular an authentication control device. The plurality of control devices makes authentication information available. The authentication information of the plurality of control devices is supplied via the data bus to the. authentication apparatus. The authentication apparatus checks whether the authentication information transmitted from the first and the second control device corresponds to the authentication information expected for the particular control devices. The authentication apparatus brings it about that the immobilizer of the vehicle is canceled when the authentication information transmitted from the first and the second control device corresponds to the authentication information expected for the particular control devices.

Other objects, advantages and novel features of the present invention will become apparent from the following detailed description of one or more preferred embodiments when considered in conjunction with the accompanying drawings.

BRIEF DESCRIPTION OF THE DRAWINGS

The FIGURE illustrates an exemplary embodiment of an electric wiring system of a motor vehicle, in accordance with the present invention.

DETAILED DESCRIPTION OF THE DRAWINGS

As illustrated in the FIGURE, an exemplary embodiment of a motor vehicle includes a plurality of control devices 4, 5, 6, and 7 that communicate with each other via a data bus 10. The electric wiring system 1 includes an immobilizer 2 that includes an authentication apparatus 3 and control devices 4 and 5.

Which subset of the control devices is part of the immobilizer in accordance with the invention can be determined via the authentication information. Thus, the immobilizer of the electric wiring system of the invention can be adapted, if required, very flexibly to a new situation. A first situation can be given, for example, if a certain control device that is part of the immobilizer has a surprisingly high failure rate in the operation of the vehicle, the immobilizer can no longer be canceled and therefore the corresponding vehicles can no longer be started. A second situation can be given, for example if a system attack on corresponding path travel locks requires a change of their functionality.

A change of the immobilizer of the invention is quite readily possible in that the subset of the control devices that are a component of the immobilizer is changed via appropriate new authentication information. The change can consist in particular in changing the particular control devices and/or adding further control devices to the immobilizer or in excluding control devices. This can be achieved according to the invention directly on the vehicle or preferably via a wireless data connection of the vehicle manufacturer with the electric wiring system of the particular vehicle in accordance with the invention. For example, the further travel can be made rapidly and permanently possible for an authorized "broken down vehicle" therewith.

A further development of the invention provides that the authentication information expected for the particular control devices is stored in the authentication apparatus for checking whether the authentication information transmitted from the first and the second control device corresponds to the authentication information expected for the particular control devices.

A preferred embodiment of the invention provides that the expected authentication information is stored protected against manipulation and reading out in the authentication apparatus.

A preferred exemplary embodiment of the invention provides that the authentication information used to check the authenticity of the control devices is stored in a changeable manner in the authentication apparatus.

An embodiment of the electric wiring system of the invention provides that the authentication apparatus receives the authentication information to be used for the authentication checks of the control devices, carries out an authentication check and after a successful authentication check the received authentication information is used for checking the authenticity of the control devices.

A further development of the invention provides that the received authentication information comprises selection information that determines which is the first control device and which is the second control device of the immobilizer.

An authentication apparatus of the electric wiring system of the invention can be economically realized with the above measures. It offers very high security against manipulations and makes possible a flexible adaptation of the functionality of the immobilizer to new situations.

A preferred embodiment of the invention provides that the engine of the vehicle only starts when the immobilizer has been canceled. It is understood that even other or further measures can be taken in order to prevent a use of the vehicle while the immobilizer is activated.

An embodiment of the invention provides that the authentication apparatus is formed by one of the control devices of the plurality of control devices. This allows an authentication apparatus in accordance with the invention to be economically realized in that at least one control device also assumes the function of the authentication apparatus in accordance with the invention by a software supplementation. In addition, this has the advantage that it can only be discovered with corresponding expense in which control device or in which control devices the authentication apparatus in accordance with the invention was implemented. For example, two or more control devices can share this task or two or more control devices can assume the function of the authentication apparatus in accordance with the invention independently of each other or parallel to each other in order to lower the costs order in order to raise the manipulation safety by the two redundant authentication apparatuses of the invention.

A preferred embodiment of the invention provides that the authentication information is coded. The transmitting of the authentication information from a data source outside the vehicle into the authentication apparatus preferably takes place on the basis of a public key process and the public key of the data source outside the vehicle is stored in a manipulation-safe manner in the authentication apparatus. The use of the known public key process clearly reduces the hardware and software expense for realizing a manipulation-safe electric wiring system that nevertheless comprises a flexibly adaptable path travel lock.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric wiring system of a motor vehicle with a plurality of control devices that communicate with each other via a data bus, and with an immobilizer,
   wherein
   the immobilizer comprises at least a first and a second control device from the plurality of control devices and an authentication apparatus,
   the plurality of control devices makes authentication information available,
   the authentication information of the plurality of control devices is supplied via the data bus to the authentication apparatus,
   the authentication apparatus checks whether the authentication information transmitted from the first and the second control device corresponds to authentication information expected for the first control device and the second control device, respectively,
   the authentication apparatus cancels the immobilizer of the vehicle when the authentication information transmitted from the first and the second control device corresponds to the authentication information expected for the first and second control devices, and
   the at least first and second control devices included in the immobilizer from among the plurality of control devices are selectable based upon the authentication information.

2. The electric wiring system according to claim 1, wherein the authentication information expected for the first and second control devices is stored in the authentication apparatus for checking whether the authentication information transmitted from the first and the second control device corresponds to the authentication information expected for the first and second control devices.

3. The electric wiring system according to claim 2, wherein the expected authentication information is stored protected against manipulation and reading out in the authentication apparatus.

4. The electric wiring system according to claim 1, wherein the authentication information used to check the authenticity of the control devices is stored in a changeable manner in the authentication apparatus.

5. The electric wiring system according to claim 1, wherein the authentication apparatus receives the authentication information to be used for the authentication checks of the control devices, carries out an authentication check, and, after a successful authentication check, checks the authenticity of the control devices based on the received authentication information.

6. The electric wiring system according to claim 1, wherein the authentication information received for the plurality of the control devices comprises selection information that determines which is the first control device and which is the second control device of the immobilizer.

7. The electric wiring system according to claim 1, wherein an engine of the vehicle only starts when the immobilizer has been canceled.

8. The electric wiring system according to claim 1, wherein the authentication apparatus is formed by one of the control devices of the plurality of control devices.

9. The electric wiring system according to claim 1, wherein the authentication information is coded, the transmitting of the authentication information from a data source outside the vehicle into the authentication apparatus takes place on the basis of a public key process, and the public key of the data source outside the vehicle is stored in a manipulation-safe manner in the authentication apparatus.

10. A method for controlling an immobilizer of an electric wiring system of a motor vehicle, comprising the acts of:
    receiving authentication information from a plurality of control devices via a data bus;
    checking whether the authentication information received from a first control device and a second control device included in the immobilizer corresponds to authentication information expected for the first control device and the second control device, respectively; and
    canceling the immobilizer of the vehicle when the received authentication information corresponds to the expected authentication information;
    wherein the first and second control devices included in the immobilizer from among the plurality of control devices are selected for inclusion in the immobilizer based upon the authentication information.

11. The method according to claim 10, wherein the authentication information expected for the first and second control devices is stored in an authentication apparatus for checking whether the authentication information transmitted from the first and the second control device corresponds to the authentication information expected for the first and second control devices.

12. The method according to claim 11, wherein the expected authentication information is stored protected against manipulation and reading out in the authentication apparatus.

13. The method according to claim 11, wherein the authentication information used to check the authenticity of the control devices is stored in a changeable manner in the authentication apparatus.

14. The method according to claim 11, wherein the authentication apparatus receives the authentication information to be used for the authentication checks of the control devices, carries out an authentication check, and, after a successful authentication check, checks the authenticity of the control devices based on the received authentication information.

15. The method according to claim 11, wherein the authentication information received for the plurality of the control devices comprises selection information that determines which is the first control device and which is the second control device of the immobilizer.

16. The method according to claim 10, wherein the authentication information used to check the authenticity of the control devices is stored in a changeable manner in an authentication apparatus.

17. The method according to claim 10, wherein an authentication apparatus receives the authentication information for authentication checks of the control devices, carries out an authentication check, and, after a successful authentication check, checks the authenticity of the control devices based on the received authentication information.

18. The method according to claim 10, wherein the authentication information received from the plurality of the control devices comprises selection information that determines which is the first control device and which is the second control device of the immobilizer.

19. The method according to claim 10, wherein an engine of the vehicle only starts when the immobilizer has been canceled.

20. The method according to claim 10, wherein the authentication information is coded, the transmitting of the authentication information from a data source outside the vehicle into an authentication apparatus takes place on the basis of a public key process, and the public key of the data source outside the vehicle is stored in a manipulation-safe manner in the authentication apparatus.

* * * * *